(12) United States Patent
Knowles

(10) Patent No.: US 6,704,964 B2
(45) Date of Patent: Mar. 16, 2004

(54) COPPER PIPE CLEANING SYSTEM

(76) Inventor: Patrick B. Knowles, 2204 Cary Rd., Algonquin, IL (US) 60102

( * ) Notice: Subject to any disclaimer, the term of this patent is extended or adjusted under 35 U.S.C. 154(b) by 221 days.

(21) Appl. No.: 09/943,974

(22) Filed: Aug. 31, 2001

(65) Prior Publication Data
US 2003/0041399 A1 Mar. 6, 2003

(51) Int. Cl.[7] .................. B08B 9/02; A46B 13/02
(52) U.S. Cl. .................. 15/104.04; 15/104.05; 15/88
(58) Field of Search .................. 15/104.04, 104.05, 15/104.09, 104.095, 104.2, 106

(56) References Cited

U.S. PATENT DOCUMENTS

| 3,824,646 A | | 7/1974 | Jal | |
|---|---|---|---|---|
| 4,238,867 A | * | 12/1980 | Ruggero et al. | 15/88 |
| 4,862,549 A | * | 9/1989 | Criswell et al. | 15/104.04 |
| 5,307,534 A | * | 5/1994 | Miller | 15/4 |
| 5,493,748 A | * | 2/1996 | Santo | 15/104.04 |
| 5,513,410 A | * | 5/1996 | Liu | 15/106 |
| 5,566,416 A | * | 10/1996 | Karls | 15/104.04 |
| 5,809,601 A | | 9/1998 | Rivera | |
| 6,065,173 A | | 5/2000 | White | |
| 6,122,790 A | | 9/2000 | Wambeke | |
| 6,393,645 B1 | * | 5/2002 | Kadinger | 15/104.04 |

* cited by examiner

Primary Examiner—Robert J. Warden, Sr.
Assistant Examiner—Shay L Balsis
(74) Attorney, Agent, or Firm—Mathew R. P. Perrone, Jr.

(57) ABSTRACT

A copper pipe cleaning assembly has an interior cleaning member and an exterior cleaning member, which are easily joined or separated as required, depending on the area of the pipe to be cleaned.

12 Claims, 2 Drawing Sheets

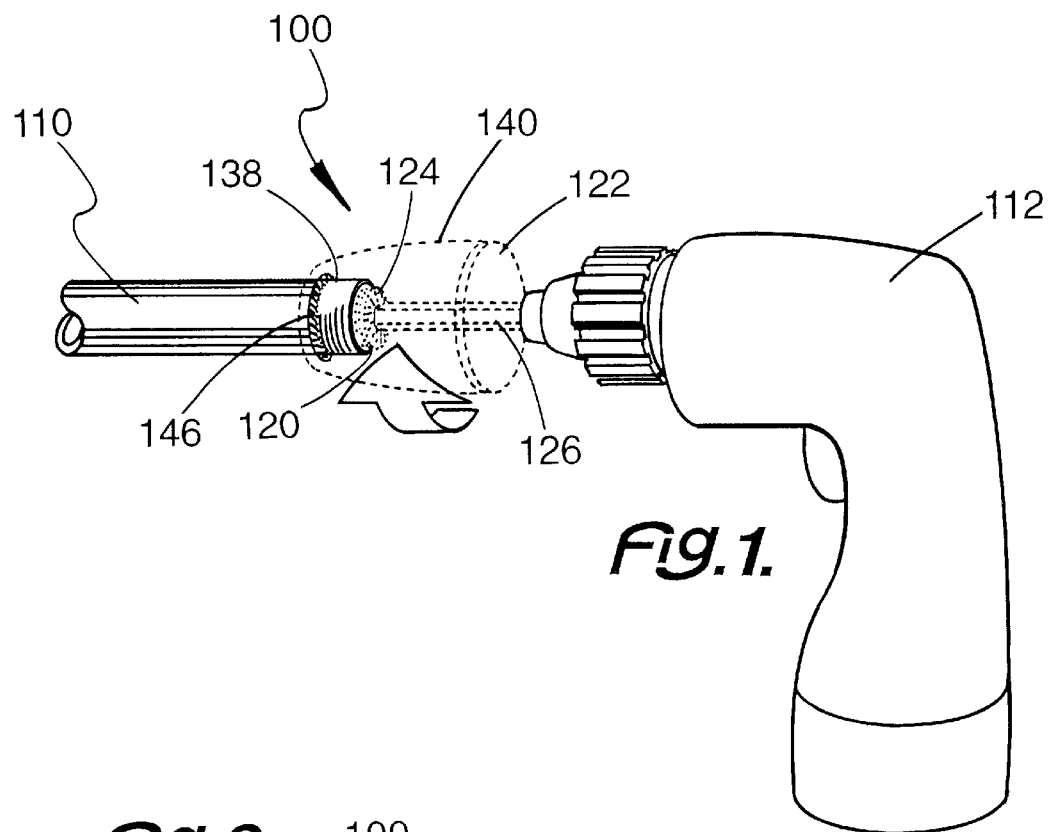
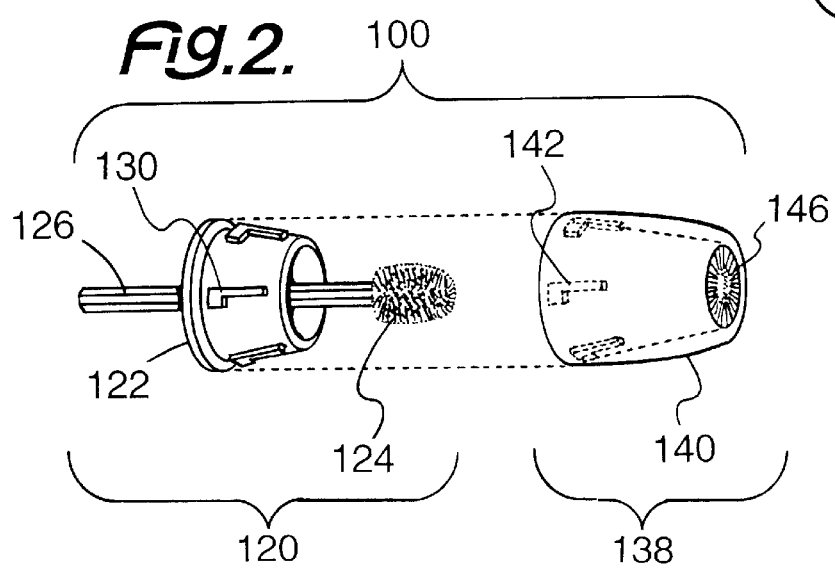

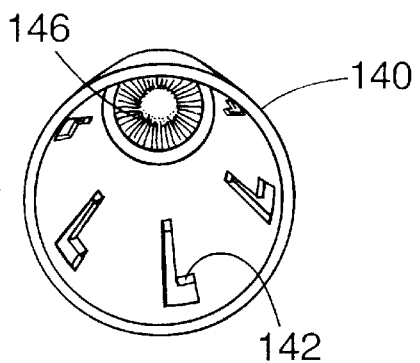
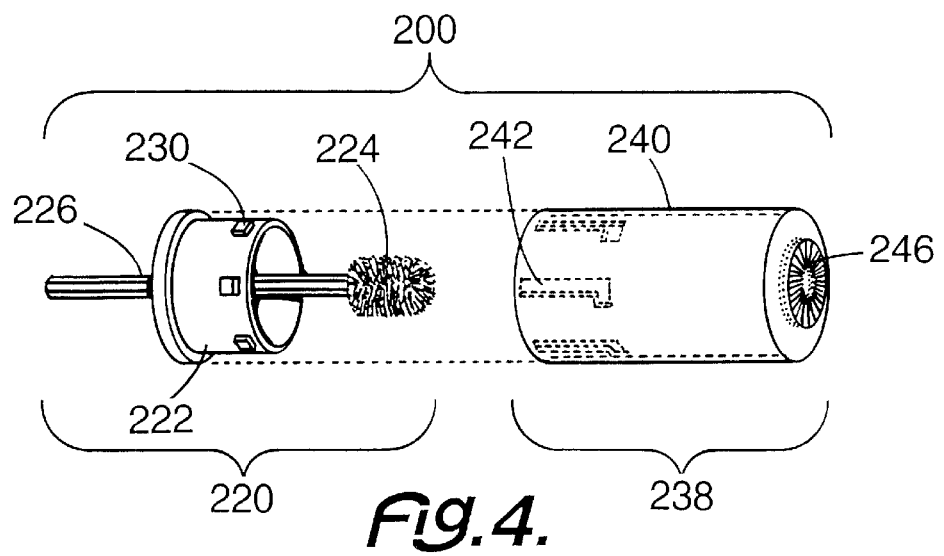
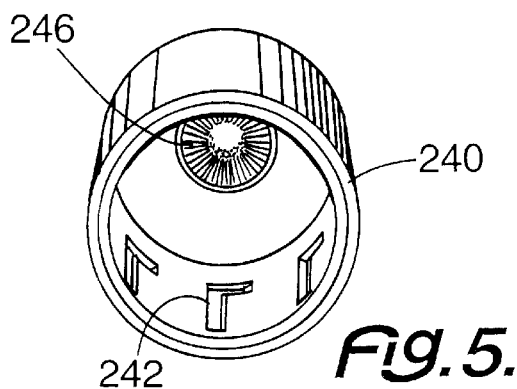

COPPER PIPE CLEANING SYSTEM

This invention relates to a pipe cleaning system, and more particularly to a copper pipe cleaning system capable of cleaning the inside and outside of a copper pipe.

BACKGROUND OF THE INVENTION

In any field wherein metal pipe is used, it is necessary to cut and bend, and then shape the pipe to its desired use. This is especially true in the field of electrical installations. Cutting of the pipe can and does result in a rough end of the pipe.

Unfortunately, in the electrical fields, it is critical to have the end of the pipe smooth. This smooth end minimizes damage to the wire as the assembly is being completed and simplifies the installation of the electrical circuits. Also, the smooth end makes it easier to install a conduit fitting, a coupler or a connector.

Soldering or brazing of pipe or tubing requires that the mating (or faying) surfaces of the pipe and fittings be thoroughly cleaned in order to present an oxide-free or a contaminant free surface, which can be wetted by the molten solder and brazing alloy. This is required to form sound joints which are free of porosity and voids, and which do not leak.

This is normally accomplished by degreasing the joint components, if necessary, and then abrading the faying surfaces. Degreasing is accomplished by wiping with a solvent appropriate for the oily contaminant to be removed.

This smooth end is especially desirable for electrometallic tubing, called EMT in the trade. While this tubing has a thin wall, it is still desirable and required to provide a smooth end after cutting the same in order for the pipe to fit into the circuit.

A known cleaning device consists of a drill mounted brush holder for cleaning the outer surface of tube ends prior to soldering or brazing. It also includes provision for adjustment of the replaceable brush to account for wear. It provides advantages of being motor driven, having replaceable brushes, and having adjustment capability for the brush. The drill mounted brush holder has a number of deficiencies.

This device cannot be used for cleaning the inside surfaces of fittings. Also, it may only clean part of the tube edge. Furthermore, its design requires a different unit for each size of tube to be cleaned. This is not a disadvantage in a manufacturing plant where a great number of assemblies are made using a single tube diameter. It will, however, be inconvenient for a household, or do-it-yourself plumber who may have to install several different sizes of tubing and fittings.

It is also difficult to switch from cleaning the pipe interior to cleaning the pipe exterior. Changing from one tool to the other in a power drill can waste a lot of time. Yet, it is very desirable to be able to clean both the inside and the outside of a copper pipe in an efficient manner.

SUMMARY OF THE INVENTION

Among the many objectives of this invention is the provision a copper pipe cleaning system adapted to clean the inside or the outside of the copper pipe.

A further objective of this invention is the provision of a copper pipe cleaning system, having an electric power supply.

Yet a further objective of this invention is the provision of a copper pipe cleaning system, having a manual power supply.

A still further objective of this invention is the provision of a copper pipe cleaning system, which changes easily between exterior cleaning and interior cleaning.

Another objective of this invention is the provision of a copper pipe cleaning system, which is easily assembled.

Yet another objective of this invention is the provision of a copper pipe cleaning system, which is easily disassembled.

Still, another objective of this invention is the provision of a copper pipe cleaning system, which is easily stored.

Also, an objective of this invention is the provision of a power-assisted method for cleaning a pipe.

A further objective of this invention is the provision of an attachment for a power tool capable of cleaning a pipe.

Yet a further objective of this invention is the provision of an attachment for a power tool capable of simplifying the installation of electrical wires.

A still further objective of this invention is the provision of an attachment for increasing the efficiency of an electrician.

Another objective of this invention is the provision of a copper pipe cleaning system, which is easily changed from the interior cleaning to exterior cleaning.

Yet another objective of this invention is the provision of a copper pipe cleaning system, which is easily changed from exterior cleaning to interior cleaning.

These and other objectives of the invention (which other objectives become clear by consideration of the specification, claims and drawings as a whole) are met by providing a copper pipe cleaning assembly having an interior cleaning member and an exterior cleaning member which are easily joined or separated as required.

BRIEF DESCRIPTION OF THE DRAWINGS

FIG. 1 depicts a perspective view of the flag copper pipe cleaning system 100 of this invention in use on pipe 110 with power drill 112.

FIG. 2 depicts an exploded, perspective view of a first embodiment in the form of flag copper pipe cleaning system 100 of this invention.

FIG. 3 depicts a perspective interior view of outer flag housing 140 for the flag copper pipe cleaning system 100 of this invention.

FIG. 4 depicts an exploded, perspective view of a second embodiment in the form of bayonet copper pipe cleaning system 200 of this invention.

FIG. 5 depicts a perspective interior view of outer bayonet housing 240 for the copper pipe cleaning system 200 of this invention.

Throughout the figures of the drawings, where the same part appears in more than one figure of the drawings, the same number is applied thereto.

DESCRIPTION OF THE PREFERRED EMBODIMENTS

Within the copper pipe cleaning system of this invention are both an interior cleaning device and an exterior cleaning device. The interior cleaning device has a drive member or drill mounting post at one end thereof, and an interior pipe cleaner at the other end thereof. Between the mounting post and the interior pipe cleaner is a male fastening mechanism. This male fastening mechanism can receive the exterior pipe cleaner.

The exterior pipe cleaner is generally cylindrical with a female fastening mechanism at one end and an exterior brush assembly at the other. The fastening mechanisms permit a quick change as desired for cleaning a pipe. The exterior pipe cleaning device may be removed or placed on the interior pipe cleaner as desired. In this fashion, is very easy to switch from interior pipe cleaning to exterior pipe cleaning and back again.

Almost any shape is suitable for the male fastening assembly and the female fastening assembly. Especially suitable for the pipe cleaning system are the cylindrical shape and the conical shape. The conical shape is preferably similar to a truncated cone with arced sides. With the shapes, the attachment of a female cleaning member to the male cleaning member is most efficient. Also with the shapes, the removal of the female cleaning member from the male cleaning member is most efficient.

The male fastening assembling and the corresponding female fastening assembly may be of any suitable type and may operated by hand without the use of any other tool. One preferred type of fastening assembly is the flag assembly. The flag assembly is comprised of a raised L-shaped male notched fastener guide onto which a raised female L-shaped notched fastener peg may slide or snap around. Another preferred type of fastening assembly is the bayonet style of fastening assembly.

Referring now to FIG. 1, FIG. 2 and FIG. 3, ease of assembly and disassembly is a major advantage of the flag copper pipe cleaning system 100 of this invention. The flag copper pipe cleaning system 100 can be switched from the flag interior pipe cleaning mode 120 to flag exterior pipe cleaning mode 138 in a relatively simple fashion.

The flag interior cleaning mode 120 of the copper pipe cleaning system 100 is depicted. Flag interior housing 122 supports flag inner brush 124 for flag interior cleaning mode 120 and permits the flag inner brush 124 to be used for cleaning a pipe interior, especially a copper pipe 110.

More particularly, flag interior housing 122 has the flag inner brush 124 extending therefrom. Also mounted on flag interior housing 122 and oppositely disposed from flag inner brush 124, is drive arm 126. Drive arm 126 fits into an electric drill 112. In this fashion, flag inner brush 124 permits power cleaning of a pipe 110.

Flag interior cleaning mode 120 is converted to flag exterior cleaning mode 138 by attaching outer flag housing 140 to flag interior housing 122. Outer flag housing 140 is likewise easily removed for conversion back to interior cleaning mode 120.

In a preferred form, outer flag housing 140 has the general shape of a truncated cone, with rounded sides, that is to say an arced conical shape. Female notched fasteners 142 are situated at the large end thereof. Flag exterior brush assembly 146 is situated at the small end thereof. However, a cylindrical shape is also suitable for use.

Flag inner brush 124 and flag exterior brush assembly 146 can be any suitable brush assembly capable of cleaning a pipe. This is especially suitable for cleaning a copper pipe used in electrical systems.

On flag interior housing 122 are a series of flag male notched fasteners 130. Outer flag housing 140 has a set of flag female notched fasteners 142 adapted to receive flag male notched fasteners 130 and lock the outer flag housing 140 on flag interior housing 122 in a removable fashion. In this fashion, the copper pipe cleaning system 100 can clean the inside and outside of a pipe, especially a copper pipe 110.

Also, mounted in flag outer housing 140 is the flag exterior brush assembly 146. Exterior brush assembly 146 is oppositely disposed from flag female notched fasteners 142. Female notched fasteners 142 join with male notched fasteners 130 as desired, in order to achieve bayonet exterior pipe cleaning mode 138. Exterior brush assembly 146 is adapted to receive the exterior end of copper pipe 110.

The term flag is adapted in order to generically refer to flag male notched fasteners 130 and flag female notched fasteners 142. These fasteners 130 and 142 cooperate to permit easily attaching and detaching of outer flag housing 140 relative to flag interior housing 122.

Referring now to FIG. 4 and FIG. 5, ease of assembly and disassembly is a major advantage of the bayonet copper pipe cleaning system 200 of this invention. The bayonet copper pipe cleaning system 200 can be switched from the bayonet interior pipe cleaning mode 220 to bayonet exterior pipe cleaning mode 238 in a relatively simple fashion.

The bayonet interior cleaning mode 220 of the bayonet copper pipe cleaning system 200 is depicted. Bayonet inner housing 222 supports bayonet inner brush 224 for bayonet interior cleaning mode 220 and permits the bayonet inner brush 224 to be used for the cleaning of a pipe interior, especially a copper pipe 110 (FIG. 1).

More particularly, bayonet inner housing 222 has the bayonet inner brush 224 extending therefrom. Also mounted on bayonet inner housing 222 and oppositely disposed from inner brush 224, is drive arm 226. Drive arm 226 fits into an electric drill 112 (FIG. 1) or other power source. In this fashion, inner brush 224 permits power cleaning of a pipe 110.

Bayonet interior cleaning mode 220 is converted to bayonet exterior cleaning mode 238 by attaching outer bayonet housing 240 to bayonet inner housing 222. Outer bayonet housing 240 is likewise easily removed for conversion back to bayonet interior cleaning mode 220. On bayonet inner housing 222 are bayonet male notched fasteners 230.

Bayonet outer housing 240 is generally cylindrical in shape and has a set of bayonet female notched fasteners 242 at one end thereof. Bayonet female notched fasteners 242 are adapted to receive bayonet male notched fasteners 230 and lock the outer bayonet housing 240 on inner bayonet housing 222 in a removable fashion. In this fashion, the copper pipe bayonet cleaning system 200 can clean the inside and outside of a pipe, especially a copper pipe 110.

Although outer bayonet housing 240 is depicted as cylindrical, as is inner bayonet housing 222, it is clear from this disclosure that an arced conical shape is also operable. Thus, ease of attaching and reattaching outer bayonet housing 240 is provided.

Also, mounted in bayonet outer housing 240 is the bayonet exterior brush assembly 246. Exterior brush assembly 246 is oppositely disposed from female notched fasteners 242. Female notched fasteners 242 join with male notched fasteners 230 as desired, in order to achieve bayonet exterior pipe cleaning mode 238. Exterior brush assembly 246 is adapted to receive the exterior end of copper pipe 110.

The term bayonet is adapted in order to generically refer to bayonet male notched fasteners 230 and bayonet female notched fasteners 242. These fasteners 230 and 242 cooperate to permit easily attaching and detaching of outer bayonet housing 240 relative to inner bayonet housing 222.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A pipe cleaning system capable of cleaning an inside and an outside of a pipe, comprising:
   (a) an interior cleaning member being adapted to clean the inside of the pipe;
   (b) an exterior cleaning member being adapted to clean the outside of the pipe;
   (c) a joining means for removably securing the interior cleaning member to the exterior cleaning member by snap or slide fasteners;
   (d) the interior cleaning member having a male housing;
   (e) the male housing having a drive member and a male cleaning member mounted thereon to form the interior cleaning member;
   (f) the exterior cleaning member having a female housing adapted to receive the male housing;
   (g) the exterior cleaning member having a female housing adapted to clean the outside of the pipe;
   (h) the exterior cleaning member having a female housing adapted to receive the male housing;
   (i) the exterior cleaning member having a female housing and a female cleaning member adapted to receive the pipe;
   (j) the joining system being a flag system;
   (k) the male housing having at least two male flag attachment devices thereon;
   (l) the female housing having at least two female flag attachment devices thereon;
   (m) each male member of the at least two male flag attachment devices having a corresponding female member in the at least two female flag attachment devices; and
   (n) each male member being adapted to cooperate with the corresponding female member.

2. The pipe cleaning system of claim 1 further, comprising:
   (a) the female housing having a conical shape;
   (b) the male housing having a conical shape;
   (c) the female housing being adapted to receive the male housing; and
   (d) the female housing being releasably attachable to the male housing.

3. The pipe cleaning system of claim 2 further, comprising:
   (a) the female housing having an arced conical shape;
   (b) the male housing having an arced conical shape;
   (C) the female housing being adapted to receive the male housing; and
   (d) the female housing being releasably attachable to the male housing.

4. The pipe cleaning system of claim 1 further, comprising:
   (a) the female housing having a cylindrical shape;
   (b) the male housing a cylindrical shape;
   (c) the female housing being adapted to receive the male housing; and
   (d) the female housing being releasably attachable to the male housing.

5. The pipe cleaning system of claim 1 further, comprising:
   (a) the drive member being a drill mounting post;
   (b) the drill mounting post being receivable in a power drill; and
   (c) the female housing being releasably attachable to the male housing with the mounting post secured in the power drill.

6. The pipe cleaning system of claim 1 further, comprising:
   (a) the at least two female flag attachment devices being six female flag attachment devices; and
   (b) the at least two male flag attachment devices being six male flag attachment devices.

7. The pipe cleaning system of claim 6 further, comprising:
   (a) the female housing having a conical shape;
   (b) the male housing having a conical shape;
   (c) the female housing being adapted to receive the male housing; and
   (d) the female housing being releasably attachable to the male housing.

8. The pipe cleaning system of claim 7 further, comprising:
   (a) the female housing having an arced conical shape;
   (b) the male housing having an arced conical shape;
   (c) the female housing being adapted to receive the male housing; and
   (d) the female housing being releasably attachable to the male housing.

9. The pipe cleaning system of claim 6 further, comprising:
   (a) the female housing having a cylindrical shape;
   (b) the male housing a cylindrical shape;
   (c) the female housing being adapted to receive the male housing; and
   (d) the female housing being releasably attachable to the male housing.

10. The pipe cleaning system of claim 9 further, comprising:
    (a) the drive member being a drill mounting post;
    (b) the drill mounting post being receivable in a power drill; and
    (c) the female housing being releasably attachable to the male housing with the mounting post secured in the power drill.

11. A pipe cleaning system capable of cleaning an inside and an outside of a pipe, comprising:
    (a) an interior cleaning member being adapted to clean the inside of the pipe;
    (b) an exterior cleaning member being adapted to clean the outside of the pipe;
    (c) a hand operable joining means for removably securing the interior cleaning member to the exterior cleaning member;
    (d) the interior cleaning member having a male housing;
    (e) the male housing having a drive member and a male cleaning member mounted thereon to form the interior cleaning member;

(f) the exterior cleaning member having a female housing adapted to receive the male housing;
(g) the exterior cleaning member having a female housing adapted to clean the outside of the pipe;
(h) the exterior cleaning member having a female housing adapted to receive the male housing;
(i) the exterior cleaning member having a female housing and a female cleaning member adapted to receive the pipe;
(j) the joining system being a flag system;
(k) the male housing having at least two male flag attachment devices thereon;
(l) the female housing having at least two female flag attachment devices thereon;
(m) each male member of the at least two male flag attachment devices having a corresponding female member in the at least two female flag attachment devices;
(n) each male member being adapted to cooperate with the corresponding female member;
(o) the at least two female flag attachment devices being six female flag attachment devices; and
(p) the at least two male flag attachment devices being six male flag attachment devices.

12. The pipe cleaning system of claim 11 wherein the male member and the female member are separable by hand.

\* \* \* \* \*